United States Patent [19]
Eulitz

[11] Patent Number: 5,459,904
[45] Date of Patent: Oct. 24, 1995

[54] CONNECTING ARRANGEMENT

[75] Inventor: Dirk Eulitz, Bonn, Germany

[73] Assignee: Kautex Werke Reinold Hagen Aktiengesellschaft, Bonn, Germany

[21] Appl. No.: 236,921

[22] Filed: May 2, 1994

[30] Foreign Application Priority Data

May 3, 1993 [DE] Germany .................. 43 14 489.6

[51] Int. Cl.[6] .................................................. B65D 63/00
[52] U.S. Cl. ........................ 24/16 R; 24/616; 248/74.3; 248/311.2
[58] Field of Search .................... 24/616, 116 A, 24/597, 682, 575, 647, 625, 588, 615, 16 R; 248/74.3, 311.2

[56] References Cited

U.S. PATENT DOCUMENTS

| 2,936,980 | 5/1960 | Rapata | 248/74 |
| 3,954,369 | 5/1976 | Körmendi | 425/326 B |
| 4,044,428 | 8/1977 | Kowalski | 24/16 R |
| 4,305,416 | 12/1981 | Henning et al. | 137/38 |
| 4,617,077 | 10/1986 | Giese et al. | 156/245 |
| 4,719,072 | 1/1988 | Kojima et al. | 264/515 |
| 5,042,114 | 8/1991 | Parrish | 248/74.3 |
| 5,071,100 | 12/1991 | Sweeny | 248/311.2 |
| 5,112,013 | 5/1992 | Tolbert et al. | 248/74.3 |
| 5,219,140 | 6/1993 | Spykerman | 248/311.2 |

FOREIGN PATENT DOCUMENTS

| 0176044 | 4/1986 | European Pat. Off. |
| 2936318 | 3/1981 | Germany. |
| 3042926 | 6/1982 | Germany. |
| 3223081 | 2/1983 | Germany. |
| 56-075832 | 6/1981 | Japan. |
| 61-225027 | 10/1986 | Japan. |
| 4091923 | 3/1992 | Japan. |
| 8000326 | 3/1980 | WIPO. |

Primary Examiner—Victor N. Sakran
Attorney, Agent, or Firm—Panitch Schwarze Jacobs & Nadel

[57] ABSTRACT

In a connecting arrangement having at least first and second parts, the first part includes at least one portion whose cross-section is adapted to the contour of an opening in the second part. The connection is made by a relative displacement whereby the first part is relatively introduced into the opening in the second part. The first part has a plurality of retaining projections which are arranged in mutually displaced relationship in the direction of the relative displacement for insertion of the first part into the opening of the second part. Which of the projections is operative for fixing of the second part in the end position thereof depends on the relative position of the second part in its end position relative to the first part.

14 Claims, 2 Drawing Sheets

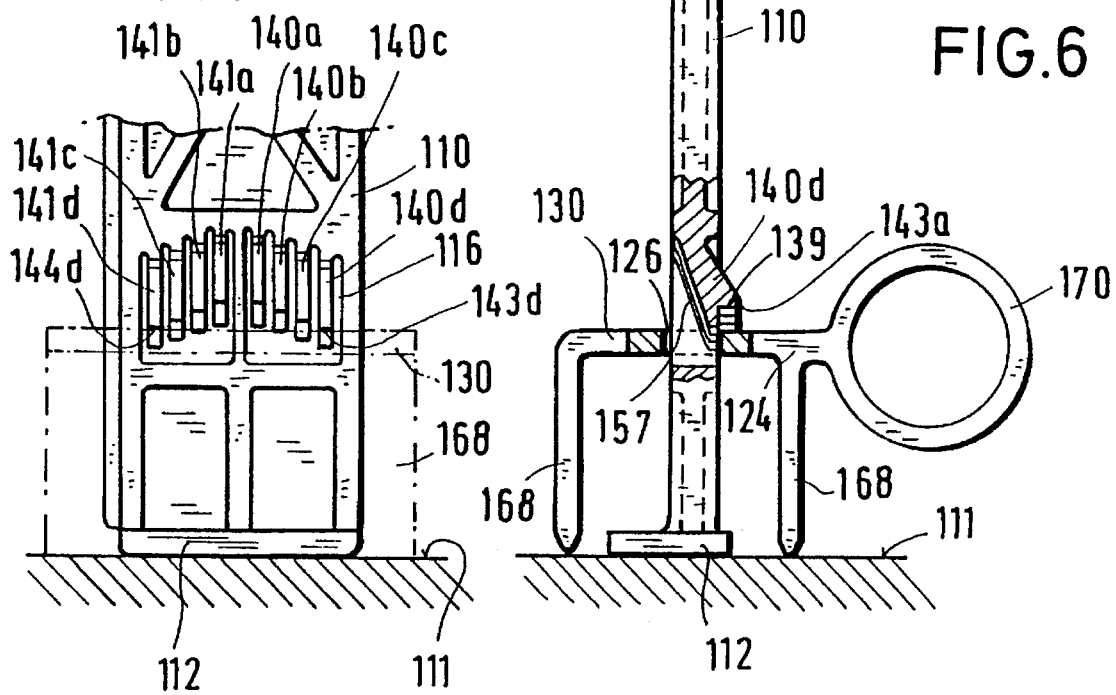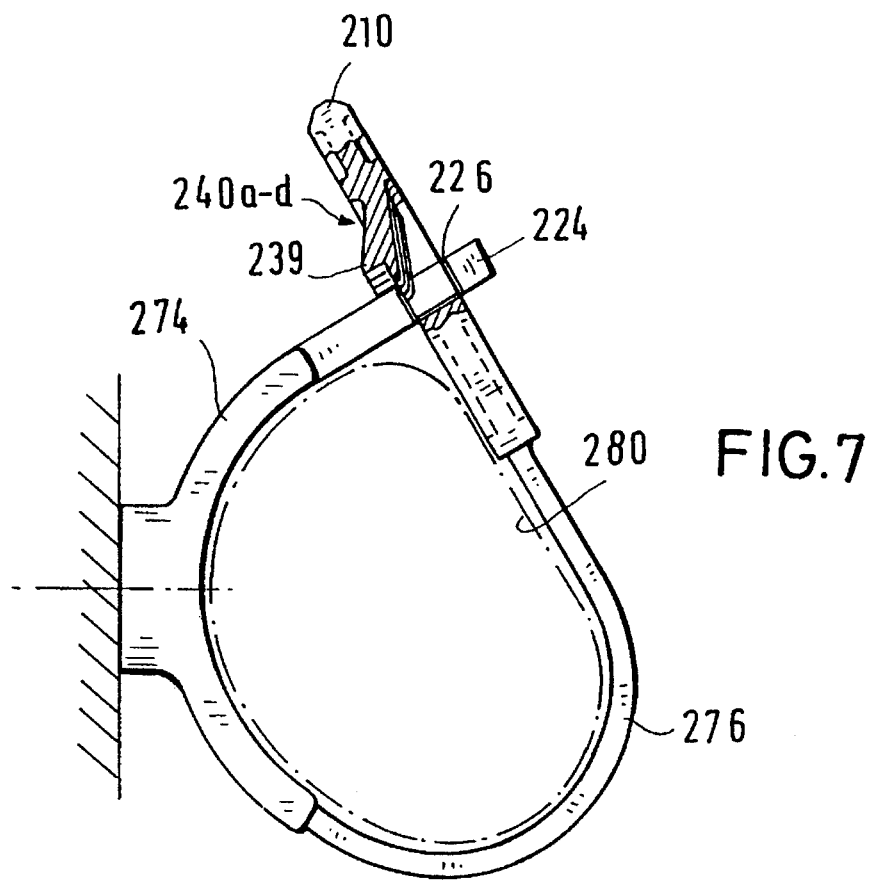

CONNECTING ARRANGEMENT

BACKGROUND OF THE INVENTION

The invention concerns a connecting arrangement.

Particularly in situations involving parts of plastics material, there is frequently a need for the parts in question to be connected together in a simple fashion, by one part being inserted by a relative movement through an opening in the other part. At the end of the relative movement which takes place in that case, as between the two parts, and thus in the relative limit position thereof, the arrangement made up of the two parts produces a retaining or snap connection which is effective at least in one direction and which involves positively locking engagement between the first and second parts such as to prevent the connection from coming loose. Connecting arrangements of that kind are particularly appropriate or necessary when the connections have to be made in an area to which access can only be achieved with difficulty. That may involve for example the interior of a container, or locations on motor vehicles which involve difficult access but in which a component has to be fitted and a connection has to be formed. In such a situation, not least also in regard to the possible difficulty of access, the retaining or snapping connection upon relative insertion of one part into the other part which for that purpose is provided with an opening should occur automatically, with the edges of the opening being able to serve as a guide means during the relative displacement as between the two parts of the connecting arrangement to make the connection.

Connections of that kind which involve the insertion of one part through an opening in another part and in which the positively locking engagement between the two parts in the connecting position is produced by a retaining or detent action are used in particular in connection with components consisting of plastic material, as the elements which co-operate with each other in the retaining or detent engagement condition can generally be integrally formed on plastic components to be connected together, in the process of producing such components, and thus do not involve separate manufacture with its attendant costs. In addition the properties of plastic materials are generally advantageous in regard to retaining or detent connections of that kind, as in particular thermoplastic materials afford the elastic deformability required therefor.

It will be noted however that retaining or detent connections of that kind require the two parts which are to be joined together to be relatively accurately positioned in their relative positions in which they are to be brought into retaining relationship, at any event when that connection is effective only in one direction, while relative movement in the other direction is prevented by a stop which is carried by or formed by another component. In many situations of use however it is difficult to satisfy that requirement as it is not always possible to predetermine with a sufficient degree of accuracy, the extent to which one part of the connecting arrangement is relatively inserted into the other part before the two parts have reached their relative end position, and whether snapping engagement to provide the retaining or detent relationship between the two parts occurs precisely in that end position, which is defined for example by a wall or another component. Difficulties in that respect may arise in particular if at least one of the two parts to be connected together, or the above-mentioned other component which defines the relative end position of the two parts, comprises plastic material because in particular some thermoplastic materials, after molding thereof, in particular in the cooling phase, suffer some distortion or can experience certain changes in configuration due to other influences. The tolerances which are caused by such subsequent variations and which cannot be readily foreseen in regard to their occurrence and the magnitude thereof may admittedly be very slight, but they are frequently sufficiently great to cause the connecting arrangement to move into its condition of retaining or detent engagement before the one part of the connecting arrangement has reached its desired or target end position, relative to the other part thereof. That can mean for example that the connection still allows a certain amount of play between the two parts, after the connection therebetween has been formed. Such play is frequently undesirable even if the durability thereof is not adversely affected as a result, as the play, even if it is very slight, can result in banging or rattling noises, for example in the case of parts which are fitted in a motor vehicle. There is also the point that in the majority of cases the situation in any case requires the parts to co-operate with each other, in their connected condition, in such a way that they cannot perform uncontrolled movements relative to each other. On the other hand, when such inaccuracies occur, there is also the possibility that the part whose end position is determined by the above-mentioned other component acting as a stop has already reached the end position of the connecting arrangement before the retaining or snap-engagement connection has moved definitively into its operative position so that in fact the two parts are not locked together at all.

SUMMARY OF THE INVENTION

An object of the present invention is to provide a connecting arrangement for connecting at least first and second parts by virtue of relative movement thereof, in such a way that the connected condition is attained by simple relative introduction or insertion of one part into an opening of the other part, while guaranteeing that the parts are in the operatively connected condition in a relative position thereof which is at least very close to the target end position thereof.

Another object of the present invention is to provide a connecting arrangement having first and second parts which are connected together by insertion of one part into an opening of the other part, which affords enhanced adaptability to fluctuations and tolerances while also being simple to manufacture.

Still a further object of the present invention is to provide a connecting arrangement having first and second parts of which a portion of one part can be introduced through an opening in the second part to afford a positively locking connection between the two parts, such that the connection can be made easily and in an at least virtually automatic fashion with the desired connecting engagement.

In accordance with the principles of the present invention the foregoing and other objects are achieved by a connecting arrangement comprising at least first and second parts of which the first part is provided with at least one portion whose cross-section is at least substantially adapted to the contour of at least one opening of the second part. To make the connection, the first part can be relatively introduced into said opening by a relative displacement as between said first and second parts. Said first part is provided with at least two retaining or latching projections which in the connected position co-operate with at least one abutment surface on the second part to produce a positively locking connection between the parts. The projections project beyond the contour of the opening of the second part, in the position of making the connection. The first part is provided with at least first and second elastically deformable retaining or latching projections which are arranged in mutually displaced relationship at small spacings parallel to the direction in which relative insertion of the first part occurs, and are associated with the same opening of the second part.

As will become more apparent from the following description of a preferred embodiment of the present invention, a portion of the one part of the connecting arrangement is fitted into an opening in the other part, or, to put that another way, the other part which is provided with the opening is passed over the said portion of the one part, and at least one of the parts is provided with a plurality of projections which provide a snap-engagement or detent connection, the projections being arranged in mutually displaced relationship in the direction of relative insertion movement. If the amount by which one of the two parts can be advanced relative to the respective other part when making the connection until either it comes to bear against an abutment for limiting the movement, on another part, or until it is prevented from further movement for some other reason, cannot be accurately and precisely defined because of the influences discussed above, it is only necessary to know the limits within which the inaccuracies to be overcome may occur. Then, in the operative condition of the connection, the respective projection which is most appropriately associated with the end position of the two parts which is actually to be adopted will come into latching engagement with the opening in the other part, thereby to produce the retained condition of the two parts of the connecting arrangement. If for example the target end position of one of the two parts which are to be connected together is determined by a third part which for example acts as an abutment, the play or clearance which may possibly remain between the two parts after the connection has been made will depend only on the magnitude of the spacings between the retaining or latching projections which are arranged in mutually displaced relationship parallel to the direction in which relative insertion occurs.

A preferred feature of the invention provides that the projections are carried by at least first and second teeth which are arranged in a comb-like configuration transversely to the direction of relative displacement, and the teeth are associated with an aperture in said portion of the first part, which is adapted to the opening of the second part, and said aperture is defined by wall regions disposed at the front and at the rear in the direction of said relative displacement, wherein the teeth extend from one of said wall regions substantially towards the oppositely disposed wall region without however being joined thereto. That design configuration makes it possible to provide a retaining or latching projection on each tooth or for each tooth to be in the form of such a projection, so that in that way the amount by which the projections are displaced relative to each other in the direction of the relative displacement can be as small as required, without the magnitudes of the spacings being influenced by any structural requirements, manufacturing conditions, space requirements in regard to manufacture, or the like. In addition the displacement of the juxtaposed teeth or the projections carried thereby can be substantially less than for example the respective dimensions of the teeth or projections, as are determined by structural considerations. The juxtaposed teeth may be at small spacings from each other. It is only necessary for them to be elastically deformable independently of each other.

BRIEF DESCRIPTION OF THE DRAWINGS

FIG. 5 is a front view of a holder with only one group of retaining projections with a second part fitted thereon, FIG. 6 is a side view of the holder shown in FIG. 5, FIG. 7 is a diagrammatic view of a third embodiment in which the two parts to be connected together form components of a structural unit in the form of a holder for holding and/or mounting a third part.

DESCRIPTION OF PREFERRED EMBODIMENTS

Figure 1:
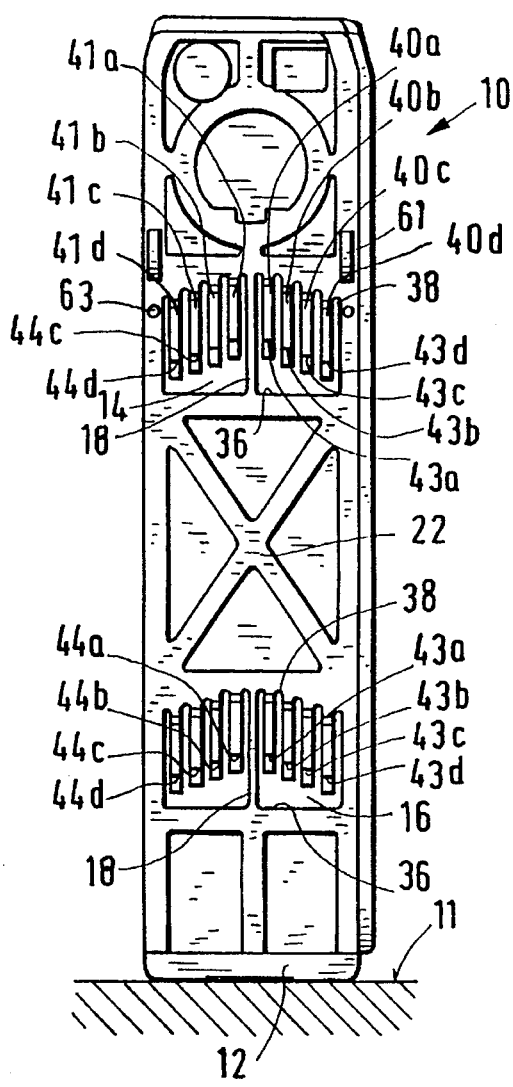
FIG. 1 is a front view of a holder which has two groups of retaining projections.
Figure 2:
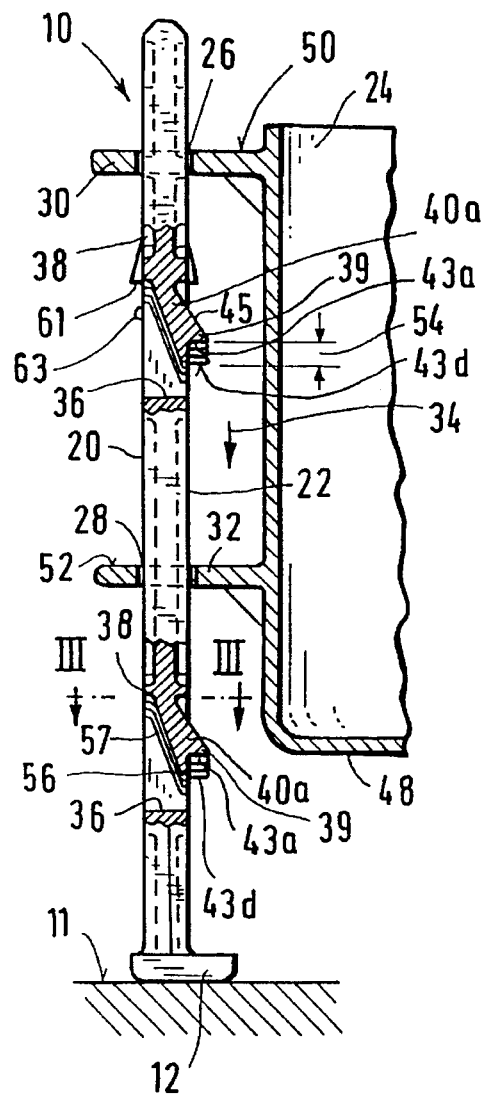
FIG. 2 is a side view of the holder shown in FIG. 1.
Figure 3:
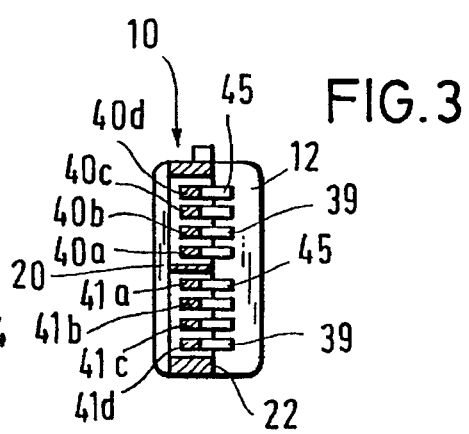
FIG. 3 is a view in section taken along line III—III in FIG. 2.

Referring firstly to FIGS. 1 through 3, shown therein is a first embodiment of a connecting arrangement according to the invention, comprising first and second parts. The first part as illustrated in FIGS. 1 through 3 is a bar-like holder which is generally indicated at 10 and which comprises thermoplastic material. It can be produced for example by injection molding. At its one end, being the lower end for example in FIG. 1, it has a foot-like enlarged portion 12 which makes it possible for the holder 10 to be welded for example to the wall as indicated at 11 of a plastic container. A necessary condition for that purpose is that the holder 10 and the wall 11 or another component to which it is welded comprise materials which can be welded together, for example polyethylene, at least in the region where the weld is to be made. Other forms of mounting the holder 10 may be employed, for example using adhesive.

The holder 10 which is of substantially rectangular cross-section is provided with two apertures 14 and 16, each of which is divided in half by a respective limb portion 18 which extends parallel to the longitudinal axis of the holder. The longitudinal axis of each aperture 14, 16 extends substantially perpendicularly to the two wide sides 20, 22 of the holder 10.

Associated with each aperture 14, 16 are means which serve to lock a second part 24 of the connecting arrangement to the holder. The second part may be for example a cup-like holder, but it may also be some other component. The only point of importance in this respect is that the second part 24 is provided with at least one opening 26 and 28 respectively, the contour of which is matched to the cross-sectional shape of the holder 10 so that extension portions 30 and 32 of the second part 24, which extension portions have the two openings 26, 28, can be fitted over the holder, as can be clearly seen from FIG. 2. In the connected position of the two parts 10 and 24, the extension portion 30 co-operates with the locking means associated with the aperture 14 while the extension portion 32 co-operates with the locking means associated with the aperture 16.

As it is assumed in regard to the embodiment shown in FIGS. 1 through 4 that the holder 10 is connected to the wall of a component, normally to make the connection between the two parts 10 and 24 the latter is fitted with its extension portions 30 and 32 over the holder 10, by a movement in the direction indicated by the arrow 34 in FIG. 2. If the conditions obtaining are different however it is also possible for the holder 10 to be inserted into the openings 26 and 28 in the extension portions 30 and 32 respectively of the part 24. It is further possible for the two parts 10 and 24 to be moved with an absolute movement, to make the connection therebetween. The way in which the holder 10 is inserted into the openings 26 and 28 of the part 24 is immaterial in regard to making the connection and thus in regard to application of the invention, so that for the sake of simplicity herein reference is primarily made to relative insertion.

The two apertures 14 and 16 are respectively defined by wall regions 36 and 38 which are disposed at the front and at the rear as considered in the direction of the arrow 34. Teeth 40a–d and 41a–d arranged in a comb-like configuration extend from the wall regions 38 which are at the rear in the direction indicated by the arrow 34, towards the oppositely disposed wall region 36, as can be particularly clearly seen from FIGS. 1 and 2. The teeth 40a–d and 41a–d respectively are integrally connected to the holder 10 and are associated in pairs with the respective apertures 14 and 16 in such a way that there are four such teeth 40a–d and 41a–d in each half of the respective apertures 14 and 16. The teeth of each aperture 14 and 16 are of the same length but are arranged at the respective wall region 38 of the holder 10 in a stepped configuration in mutually displaced relationship in the longitudinal direction in such a way that the tooth 40a which is immediately adjacent to the central limb portion 18 is at the greatest spacing from the oppositely disposed wall region 36, while the respective outwardly disposed teeth 40d and 41d are at the smallest spacing from the oppositely disposed wall region 36. The teeth which are disposed between the central and the outward teeth are so arranged as to provide uniform stepping from the center outwardly. In that respect the teeth of both halves of the apertures 14 and 16 are arranged in mirror-image relationship with each other.

FIG. 2 in particular shows that all teeth 40a–d are arranged inclinedly as they extend away from the wall region 38, in such a way that their end regions which are towards the wall region 36 or the base portion 12 project beyond the contour of the holder 10 at the wide side 22 thereof. Each tooth end region which projects beyond said contour thus forms a retaining or detent or latching projection 39 which is defined by an end face 43a–d and 44a–d respectively which extends substantially perpendicularly to the longitudinal axis of the holder 10 and thus the direction indicated by the arrow 34. By virtue of the above-mentioned stepped arrangement of the teeth 40a–d and 41a–d respectively and the fact that all teeth are of substantially the same configuration, the arrangement of the end faces 43a–d and 44a–d of the projections is one in which they are arranged in mutually displaced relationship in the direction indicated by the arrow 34, the spacing of the end faces 43a–d and 44a–d respectively in the direction of the relative displacement as indicated by the arrow 34 being less than one millimeter in this embodiment. At the same time the end faces, in a manner corresponding to the arrangement of the teeth 40a–d and 41a–d respectively, are also displaced relative to each other transversely to the direction indicated by the arrow 34 or the longitudinal axis of the holder 10.

As the holder 10 including the teeth 40a–d and 41a–d which are integral therewith comprises thermoplastic material, the teeth are elastically deformable. That is necessary as the teeth, with their end portions 39 projecting beyond the respective end faces 43a–d and 44a–d, also project beyond the contour of the respective openings 26 and 28, as can be seen from FIG. 2. The two openings are matched to the cross-sectional shape of the holder 10 so that the wall regions, which define the openings 26 and 28 respectively, of the extension portions 30 and 32 perform a guide function upon relative displacement as between the two parts 10 and 24. FIG. 2 also shows that, upon further displacement of the part 24 in the direction indicated by the arrow 34, the extension portions 30 and 32 move into the region of the teeth 40a–d and 41a–d. When that happens, because those teeth project beyond the contour of both the holder 10 and also the two substantially identical openings 26 and 28 in the extension portions 30 and 32 respectively, the teeth are elastically deformed in such a way that they are firstly pivoted somewhat into the region of the respective aperture 14 and 16 respectively. For that purpose, at their projection portion 39 which projects beyond the contour of the holder 10, the teeth are defined by smooth surfaces as indicated at 45 in FIGS. 2 and 4, which extend at an acute angle relative to the direction indicated by the arrow 34. The wall regions which define the openings 26 and 28 slide along the surfaces 45, with correspondingly increasing deformation of the teeth on which those surfaces are to be found. In order to facilitate such deformation which represents a kind of pivotal movement of the respective tooth approximately around the connecting region between that tooth and the holder 10 on the wall region 38, the teeth 40a–d and 41a–d, at their side towards the wide side 20 of the holder 10, are also defined by an inclinedly extending surface as indicated at 57 in FIG. 4, so that within the contour of the holder 10 that is defined by the two surfaces 20 and 22 thereof, there is space into which the teeth 40a–d and 41a–d can respectively deflect when they are elastically pivoted under the effect of the extension portion 30 or 31 respectively towards the boundary surface of the wide side 20 of the holder 10, that is to say into the respective aperture 14 and 16 therein.

The movement of the part 24 in the direction indicated by the arrow 34 terminates at the moment at which the bottom 48 of the part 24, which bottom is towards the wall 11 of the component, bears against the wall 11. That defines the end position of the part 24, in which it is to be fixed by means of the teeth on the holder 10, together with the wall 11. In the course of the movement in the direction indicated by the arrow 34, the extension portions 30 and 32 firstly pass over the two end faces 43a and 44a of the respective pair of teeth 40a and 41a, whereupon, as soon as the top surfaces 50 and 52 respectively of the extension portions 30 and 32 are in positions beneath the end faces 43a and 44a, the two pairs of teeth 40a and 41a spring quickly back into their starting position as shown in FIGS. 1 through 3, by virtue of their elastic return force. If, at that moment, the bottom 48 of the part 24 is already in contact with the wall 11, the movement of the part 24 in the direction of the arrow 34 is concluded. It is then the two pairs of teeth 40a and 41a whose end faces 43a and 44a provide for positively locking engagement with the surfaces 50 and 52 of the respective extension portions 30 and 32, that prevent the part 24 from moving again in the opposite direction to the direction indicated by the arrow 34, so that the part 24 cannot come loose from the holder 10. As a result therefore the end regions of the two pairs of teeth 40a and 41a respectively form a retaining or latching projection which takes up a position in front of the associated extension portion 30 and 32 respectively and co-operates in the above-described manner with their surfaces 50 and 52 which extend approximately parallel to the end faces of the teeth. In other words, the other pairs of teeth 40b–40d and 41b–41d remain in their elastically pivoted position in which they are therefore inoperative in terms of fixing the part 24 on the holder 10.

If, at the above-described moment at which in the course of the movement of the part 24 in the direction indicated by the arrow 34 the extension portions 30 and 32 pass the pairs of end faces 43a and 44a, the bottom 48 of the part 24 is not yet in a position of bearing against the wall 11 which, as will be seen from the foregoing description, acts as an abutment, then the movement of the part 24 in the direction indicated by the arrow 34 is continued. In that case, when the appropriate positions of the extension portions 30 and 32 are reached, the pairs of teeth 40b and 41b will firstly move quickly back into their operative positions as shown in FIGS. 1 through 3 so that their end faces 43b and 44b come to lie above the upwardly facing surfaces 50 and 52 of the extension portions 30 and 32.

If at that moment the bottom 48 of the part 24 is still not bearing against the wall, the movement of the part 24 in the direction indicated by the arrow 34 is continued still further. It will be seen therefore that the pair of teeth which produce the positively locking engagement to fix the part 24 in the connected position as defined above depends on the position of the extension portions 30 and 32 relative to the holder 10, at the moment at which the part 24 bears against the wall 11. In that way, the part 24 is always locked on the holder 10 and thus also the part 24 is also fixed relative to the wall 11, at any event, irrespective of the precise position of the wall 11 in the region in which the bottom 28 of the part 24 comes to bear against the wall 11. The clearance which then may possibly still remain between the wall 11 and the pair of teeth which provide the positively locking engagement to secure the part 24 on the holder 10 depends only on the spacings between two end faces 43a–d and 44a–d respectively, which occur in succession in the direction indicated by the arrow 34. The shorter such spacings are, the smaller is the possible amount of clearance. FIGS. 1 and 2 which show the holder 10 approximately in its actual size show that, by virtue of the fact that each tooth has only one end face, it is possible for the end faces of the teeth to be arranged at spacings from each other, in the direction indicated by the arrow 34, which can be less than one millimeter. In that respect, the end faces can also be displaced laterally relative to each other, by virtue of the comb-like arrangement of the teeth 40a–d and 41a–d respectively. In that arrangement, the spacing as indicated at 54 in FIG. 2, between the two extreme end faces 43a, 43b, and 44a, 44b respectively, as considered in the direction indicated by the arrow 34, determines the maximum spacing, within whose tolerances it is possible to provide compensation and equalization. In that respect it is to be borne in mind that such tolerances may not be caused just by deviations in regard to the position of the wall 11 in the region in which the bottom 48 of the part 24 comes into contact with the wall 11. Such tolerances may also be possible in regard to the part 24 and thus in regard to the position of the bottom 48 thereof, more specifically in particular when the part 24 consists of thermoplastic material. Accordingly it may also be possible that, in the end position of the part 24, the upper extension portion 30 thereof forms the positively locking engagement with the teeth 40a and 41a associated with the aperture 14, or more specifically the end faces 43a and 44a thereof, whereas the lower extension portion 32 co-operates with the teeth 40c and 41c associated with the lower aperture 16.

Figure 4:
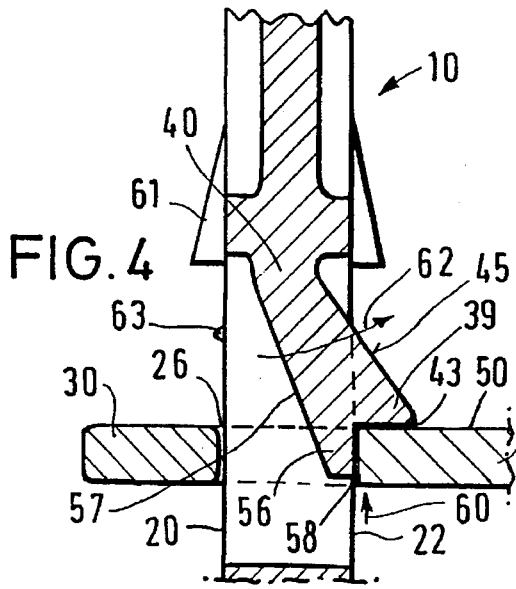
FIG. 4 is a side view on a larger scale of a detail from the FIGS. 1 through 3 structure.

Each of the teeth 40a–d and 41a–d is provided with a prolongation portion as indicated at 56 in FIGS. 2 and 4, which extends beyond the respective end face 43a–d and 44a–d towards the oppositely disposed wall region 36 of the respective aperture 14 and 16, while however terminating short of that wall region 36. FIG. 4 shows that when for example the end face 43 of the tooth 40 bears against the upwardly facing surface 50, which acts as an abutment, of the extension portion 30 on the part 24, the prolongation portion 56 is disposed behind the boundary surface 58 of the opening 26 in the extension portion 30 so that a force acting on the extension portion 30 and thus on the tooth 40 in the direction indicated by the arrow 60 in FIG. 4 cannot give rise to an elastic pivotal movement of the tooth 40 in the direction indicated by the arrow 62 in FIG. 4, as the prolongation portion 56 bears against the wall 58 which defines the opening 26 and that therefore prevents the tooth from pivoting in the direction indicated by the arrow 62; such pivotal movement would result in disengagement of the positively locking engagement between the extension portion 30 or its surface 50 and the respective tooth 40. Due to that design configuration, even when using soft-elastic plastic materials for the tooth-like projections or even for the whole of the part 10, it is possible to produce a connection which durably guarantees that the co-operating parts are arranged in stable positions, under normal conditions of loading.

The small projections which are shown at 61 and 63 in FIGS. 1, 2 and 4 and which are disposed at the wide sides 20 and 22 of the holder serve to hold for example the part 24 in an intermediate position on the holder 10 before the part 24 is moved relative to the holder 10 into the definitive position in which it is fixed in its end position by two pairs of teeth on the holder 10, and the wall 11. The arrangement of the part 24 in such an intermediate position which is defined by the projections 61 and 63 may be desirable for example when the two parts 10 and 24 are already to be connected together before the holder 10 is welded or otherwise joined to the wall 11. That may be particularly desirable if difficulties are encountered in fitting the part 24 on to the holder 10 when the holder 10 is already occupying its definitive position. There are also other situations of use in which it is desirable and possibly even necessary for the two parts 10 and 24 to be firstly provisionally connected together by the part 10 being inserted through the two openings 26 and 28 in the extension portions 30 and 32 until the extension portion 30 occupies a position between the two projections 61 and 63, in which case the part 24 is only later moved into its definitive connected position. The projections 61 and 63 are of such a configuration and size that the extension portion 30 of the part 24 can be pushed over same when a small force is applied, in the direction indicated by the arrow 34.

Reference will now be made to FIGS. 5 and 6 showing a further embodiment of the connecting arrangement in accordance with the present invention. This embodiment corresponds in its fundamental structure to the embodiment described above with reference to FIGS. 1 through 4 so that corresponding parts and components are denoted by the same reference numerals but increased by 100. The holder 110 in this embodiment is provided with only one aperture 116 and group of teeth 140a–d and 141a–d which are also arranged in mirror-image relationship with each other in the two halves of the aperture 116. In this case also the holder 110 is provided with an enlarged foot or base portion 112 which is joined to the wall 111 of a component, for example by welding or possibly also adhesive. The second part 124 essentially comprises a limb portion 130 which has an opening 126 and which is provided with two supports 168, free ends of which bear against the wall 111 in the connected position of the two parts 110 and 124 of the arrangement. The second part 124 serves for mounting components in tube or hose form. For that purpose the second part 124 is provided with an annular support portion 170 through which a hose or tube can be passed. The second part 124 is mounted on the holder 110 in the manner already described above in relation to the embodiment described with reference to FIGS. 1 through 4. In this case also it is possible to compensate for tolerances by virtue of the fact that the arrangement has a plurality of retaining or latching projections which are arranged in mutually displaced relationship in the longitudinal direction of the holder 110, with end faces 143*a–d* which are in mutually displaced relationship in the longitudinal direction of the holder 110. The top side of the limb portion 130 which serves as an abutment surface co-operates with the pair of end faces 143*d* and 144*d* in the end position of the part 124, in the case of the embodiment shown in FIGS. 5 and 6. In this situation all teeth again assume their normal position in which they are not elastically deformed as all end faces are disposed above the limb portion 130.

Reference will now be made to FIG. 7 in which parts and components corresponding to those described above are identified by the same reference numerals but increased by 200. The embodiment shown in FIG. 7 represents a particular configuration insofar as here the two parts 210 and 224 are parts of the same structural unit 274 which is mounted to the wall of another supporting component. The part 210 is provided substantially in the above-described fashion with teeth 240*a–d* which are of the configuration and arrangement already described above with reference to the embodiments shown in FIGS. 1 through 4 and FIGS. 5 and 6. The holder 210 is passed by a relative movement through a hole 226 in the second part 224. In this case also the parts co-operate in the manner already described above. The first part 210 is provided with a flexible component, for example a strip or band 276 which is also part of the unit 274, and which, when the parts 210 and 224 are connected together as shown in FIG. 7, can serve for example for supporting a hose or the like as indicated diagrammatically at 280. In this case, the adaptability which is achieved by virtue of the arrangement and configuration according to the invention of the teeth 240*a–d* serves in particular to take account of the deformability of the hose 280 or the like, when the holding band or strip 276 is fitted around the hose or the like. In regard to the embodiment shown in FIGS. 6 and 7, it may also be desirable for the teeth to be arranged in pairs as, at any event with a mirror-image arrangement as shown in FIGS. 1 through 6, that means that forces act symmetrically on the two parts which are to be connected together.

Whether, as in the embodiment shown in FIGS. 1 through 4, the holder 10 is provided with two groups of teeth so that the second part 24 is fixed at first and second locations, or whether the arrangement has only one group of teeth as shown in the embodiments of FIGS. 5, 6 and 7, depends on the respective circumstances involved and in particular the respectively required compensation for tolerances in respect of the part 24 or 124 to be fixed or possibly the component 280. It is moreover also possible for the respective second part to be fixed by two or more holders 10. In that case, for example in regard to the embodiment shown in FIGS. 1 through 4, the second part would also be provided with further openings 26 and 28 through which a second holder 10 can be passed by means of a relative movement, in order to provide for additional support and fixing of the second part 24.

In a departure from all the embodiments described above with reference to the drawings, it is also possible for the teeth to be of different lengths, in order to afford the stepped arrangement of the end faces of the teeth, so that for example the wall portion 38 defining the respective aperture 14 or 16 is of a substantially linear configuration, corresponding to the wall portion 36. It will be noted however that teeth of the same length have the advantage that all the teeth afford the same elastic deformability without the need to take particular measures to achieve that effect, thus for example by making the teeth of different thicknesses, or the like.

It has already been mentioned that the first and second parts which are to be connected together comprise plastic material and are thus easily elastically deformable when of a suitable shape. In addition however it is also possible for the respective second part to be made from a different material, for example a metal, as in general the elastic deformability of the parts bearing the retaining or detent projections 39; 139; 239 is sufficient to guide the second part relative to the first part over at least one of the retaining or detent projections, to provide for the retaining or snap-engagement condition.

Although in the embodiments illustrated in the drawing the teeth or retaining or detent projections all face towards the same side of the respective part 10, 110 and 210, it is also readily possible to adopt design configurations in which one group of teeth or retaining or detent projections project towards one side of the part 10, 110, 210, while another group of teeth or retaining projections project towards the other side thereof. In that respect, the arrangement may be such that successive teeth or projections project alternately towards one side and the other. It is also possible for example in the embodiment shown in FIGS. 1 and 2 for the teeth or projections of the upper group to project in one direction and for the teeth and projections of the other group to project in the other direction. In addition the teeth and projections in one half of the aperture 14, 16 may face in one direction while those in the other half face in the opposite direction.

It will be appreciated that the above-described embodiments of the present invention have been set forth solely by way of example and illustration of the principles of the invention and that various other modifications and alterations may be made therein without thereby departing from the spirit and scope of the invention.

What is claimed is:

1. A connecting arrangement comprising at least first and second parts, the second part having at least one opening therein and the first part including at least one portion having a cross-section which is configured with respect to said one opening of the second part such that at least said one portion of said first part can be inserted into said opening of said second part by a relative displacement between said first and second parts, said one portion of said first part further including at least first and second elastically deformable projections, said first and second projections immediately adjoining one another, said first and second projections being arranged in a mutually displaced relationship at a small spacing parallel to a direction of said relative displacement in which said first part is inserted into said one opening of said second part and in a mutually displaced relationship transversely to said direction of relative displacement, at least one of said first and second projections being closer to the remaining one of the first and second projections than said one projection is to any other elastically deformable projection of said one portion, and said first and second projections being sized and shaped to pass through the one opening and to thereafter project beyond said one opening so as to cooperate with at least one abutment surface on said second part adjoining said one opening to produce a positive locking connection between said first and second parts.

2. An arrangement as set forth in claim 1 wherein said second part has a wall portion adjoining said opening, said wall portion providing said at least one abutment surface.

3. An arrangement as set forth in claim 1 including at least first and second teeth which are arranged comb-like transversely to said direction of relative displacement and on which said projections are carried, wherein said portion of said first part has an aperture defined by wall regions disposed at the front and at the rear in said direction of relative displacement, said teeth being associated with said aperture and extending from one of said wall regions substantially towards the oppositely disposed wall region.

4. An arrangement as set forth in claim 3 wherein the surfaces of teeth at a side of said first part at which said projections are disposed are arranged to extend inclinedly relative to said direction of relative displacement in such a way that in a direction towards they increasingly project relative to a contour of the first part.

5. An arrangement as set forth in claim 3 wherein thickness of the teeth in a direction of an axis of the associated aperture is at least not substantially greater than a thickness of said portion of said first part.

6. An arrangement as set forth in claim 3 wherein surfaces of the teeth at the side of said first part which is remote from said projections extend inclinedly in a non-deformed condition in such a way that towards a free end of the respective tooth a spacing thereof from a contour of said first part at the second side thereof increases.

7. An arrangement as set forth in claim 3 wherein the individual teeth are of at least substantially a same length and are connected to said one wall region in mutually displaced relationship parallel to the direction in which the relative displacement between said first and second parts occurs in accordance with the spacings of the projections carried thereby.

8. An arrangement as set forth in claim 3 wherein each tooth has a free end portion and at a side thereof remote from the respective projection a prolongation portion which extends substantially in the longitudinal direction of the tooth and which engages behind said second part in a connected condition of said first and second parts.

9. An arrangement as set forth in claim 8 wherein said first part has a wide side and wherein the surface of the prolongation portion, which surface is towards the respective projection, is disposed substantially in a plane in which a contour of the tooth-carrying portion of the first part extends at the associated wide side.

10. An arrangement as set forth in claim 9 wherein said first part is a holder.

11. An arrangement as set forth in claim 3 wherein the teeth are arranged in pairs in such a way that the projections of a pair of teeth are operative simultaneously to make the connection between said first and second parts.

12. An arrangement as set forth in claim 11 wherein arranged within said aperture are at least the first and second teeth having projections co-operable with said abutment surface of said second part in the connected position of said first and second parts.

13. An arrangement as set forth in claim 12 wherein said aperture is divided at least substantially in half in said direction of relative displacement and wherein provided in each half is a group of teeth which correspond to the teeth of the respective other group and which are arranged in mirror-image relationship with same.

14. An arrangement as set forth in claim 1 wherein said first part and said second part are components of a structural unit adapted to serve for mounting at least one further part.

* * * * *